United States Patent [19]

Ishida

[11] 4,222,534
[45] Sep. 16, 1980

[54] FISHING REEL

[75] Inventor: Takuo Ishida, Sennan, Japan

[73] Assignee: Shimano Industrial Company, Limited, Osaka, Japan

[21] Appl. No.: 7,178

[22] Filed: Jan. 29, 1979

[30] Foreign Application Priority Data

Feb. 4, 1978 [JP] Japan .................................. 53-13048

[51] Int. Cl.³ ............................................ A01K 89/01
[52] U.S. Cl. ............................... 242/84.2 R; 242/118.5
[58] Field of Search ................... 242/84.21 R, 84.2 R, 242/84.2 G, 118.5

[56] References Cited

U.S. PATENT DOCUMENTS

| | | | |
|---|---|---|---|
| 2,010,811 | 8/1935 | Craig | 242/118.5 |
| 2,561,801 | 7/1951 | King | 242/118.5 |

FOREIGN PATENT DOCUMENTS 232544   8/1944   Switzerland .......................... 242/84.2 R Primary Examiner—Billy S. Taylor
Attorney, Agent, or Firm—Stevens, Davis, Miller & Mosher

[57] ABSTRACT

A fishing reel is described whose spool has a pair of first and second flanges, the first flange located at the side for drawing out a fishing line for casting and being smaller in diameter than the second flange. An annular edge is provided at said first flange outer circumference projecting forward of a reel body. The spool slidably supports a sliding cylinder having a fishing line guide in close contact with the projecting edge, so that a change of bulk of line wound onto the spool allows the sliding cylinder to slide, whereby contact resistance applied to the line which is drawn out in contact with the first flange is controlled so as not to increase correspondingly with the length of the drawn-out line.

3 Claims, 6 Drawing Figures

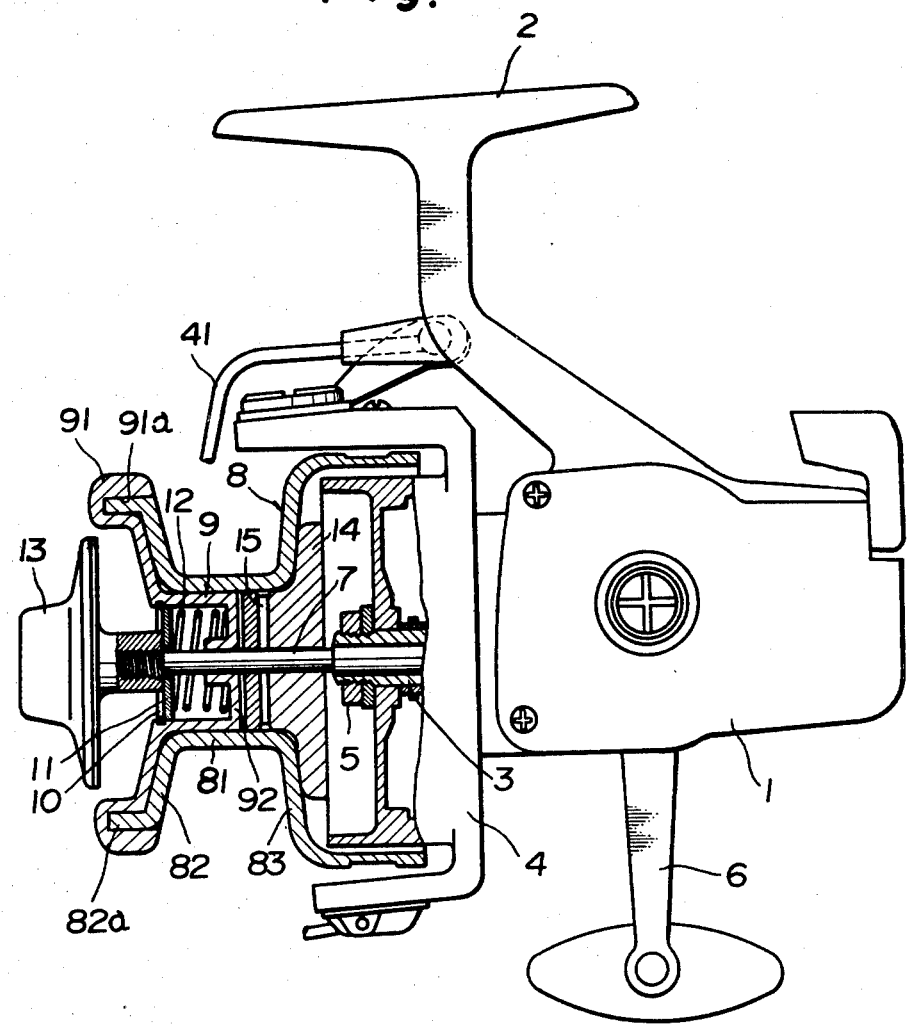

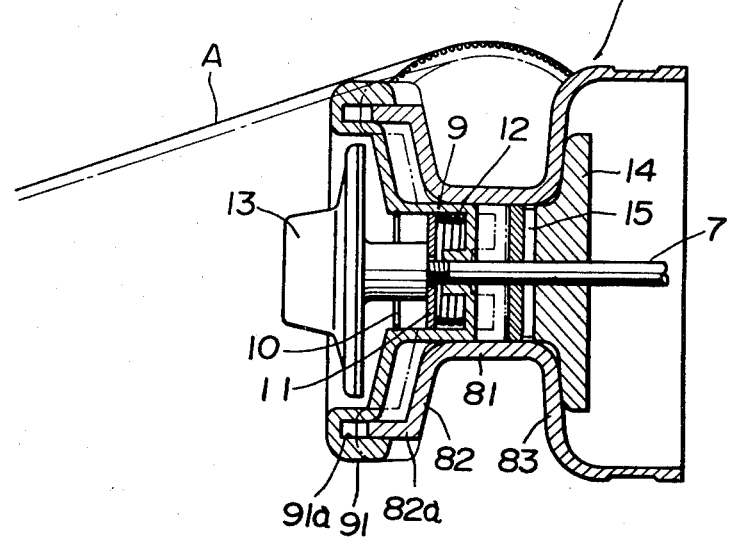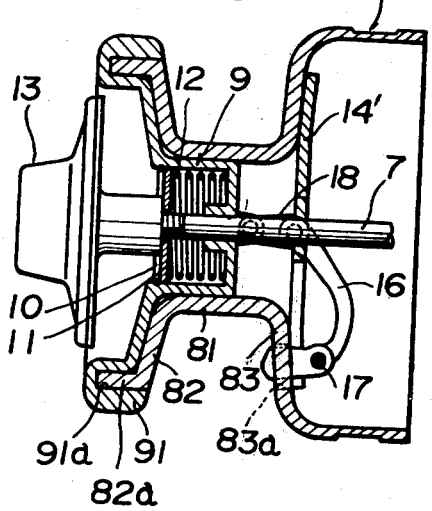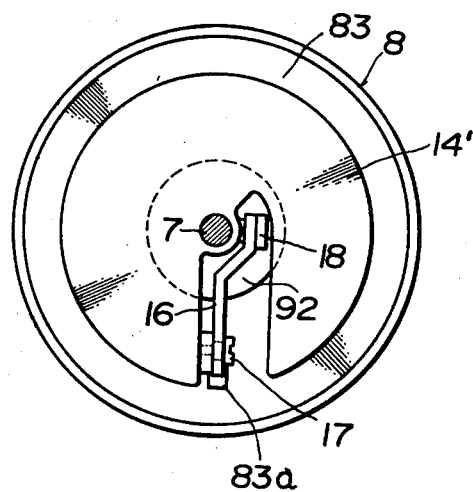

FISHING REEL

This invention relates to a fishing reel and more particularly to a fishing reel of the spinning type.

Generally, the fishing reel of the spinning type is so constructed that a tubular shaft driven by operating a reel handle is rotatably supported at the front of a reel body, a rotary frame having a bail arm is mounted to the tubular shaft, and a spool is mounted to a spool shaft supported to the tubular shaft, so that the rotary frame is rotated to allow a fishing line to be caught by the bail arm and wound onto the spool, or the bail arm is turned over to release the line therefrom permitting the line to be drawn out of the spool during casting with a sinker at an end of the line.

The fishing reel constructed according to the foregoing has a spool S whcih comprises a trunk $S_1$ and a pair of first and second round flanges $S_2$, $S_3$ at both axial ends of the trunk $S_1$ as shown in FIG. 6, the flanges $S_2$ and $S_3$ being approximately equal in diameter. The line A wound onto the spool S, when drawn out thereof for casting, contacts with the outer periphery of the first flange $S_2$, whereby the line A is subjected to contact resistance. The contact resistance is almost negligible when the wound line from a larger bulk has an apparent outer diameter larger than that of the flange $S_2$. However, the wound line, after casting, decreases in length and contacts along a larger length of the flange $S_2$ resulting in an increase in contact resistance.

In other words, the contact resistance affects the casting distance of the line, whereby the increasing resistance acts to brake the line, resulting in an decreased casting distance.

SUMMARY OF THE INVENTION

An object of the invention is to provide a fishing reel capable of controlling the contact resistance between the fishing line and a flange at the side of the spool where the line is drawn out, thereby keeping a sufficient length of drawn out line and permitting a rig to be cast to a desired place.

The fishing reel of the invention is so constructed that the spool has a pair of first and second flanges, the first flange being located at the side for drawing out the line, and is made smaller in diameter than the second flange. The spool rotatably carries a sliding cylinder having a fishing line guide in close contact with an annular edge projecting forward of a reel body from the outer circumference of the first flange, so that the line when changing in winding length during winding onto the spool, allows the sliding cylinder to slide, whereby contact resistance applied to the line when contacting the first flange, is controlled to prevent a corresponding increase in resistance with a change of length in the drawn-out line.

In other words, when the fishing line is wound onto the spool in a larger length, the force from winding the line is used to allow the sliding cylinder to slide forward in the line direction of the draw out. On the contrary, when the length of the wound line decreases after casting, the sliding cylinder moves backward, i.e., toward the reel body, through a spring attached to the same, thereby preventing the contact resistance from increasing when the length of wound line decreases.

These and other objects of the invention will become more apparent in the detailed description taken in connection with the accompanying drawings.

DESCRIPTION OF THE DRAWINGS

FIG. 1 is a partially cutaway side view of an embodiment of a fishing reel of the invention, FIG. 2 is a longitudinal sectional view of a principal portion of the fishing reel in FIG. 1, showing the function of a sliding cylinder, FIG. 3 is a longitudinal sectional view of a principal portion of a modified embodiment of a fishing reel of the invention, the principal portion corresponding to that in FIG. 2, FIG. 4 is a right side view of the principal portion in FIG. 3.

Referring to FIG. 1, reference numeral 1 designates a reel body of a box-like shape and having a leg 2 for mounting the reel body to a fishing rod. The reel body 1 rotatably supports at the front thereof a tubular shaft 3 at the fore end of which a rotary frame 4 having a bail arm 41 is supported rotatably through a nut 5. The tubular shaft 3 is connected through a master gear (not shown) and pinion (not shown) with a handle shaft (not shown) driven by a crank handle 6 supported to the reel body 1, thereby being rotated by operating the handle 6. Such a construction is fundamental to the spinning reel and the aforesaid master gear and pinion are sufficiently known to be understandable by those skilled in the art.

Figure 5:
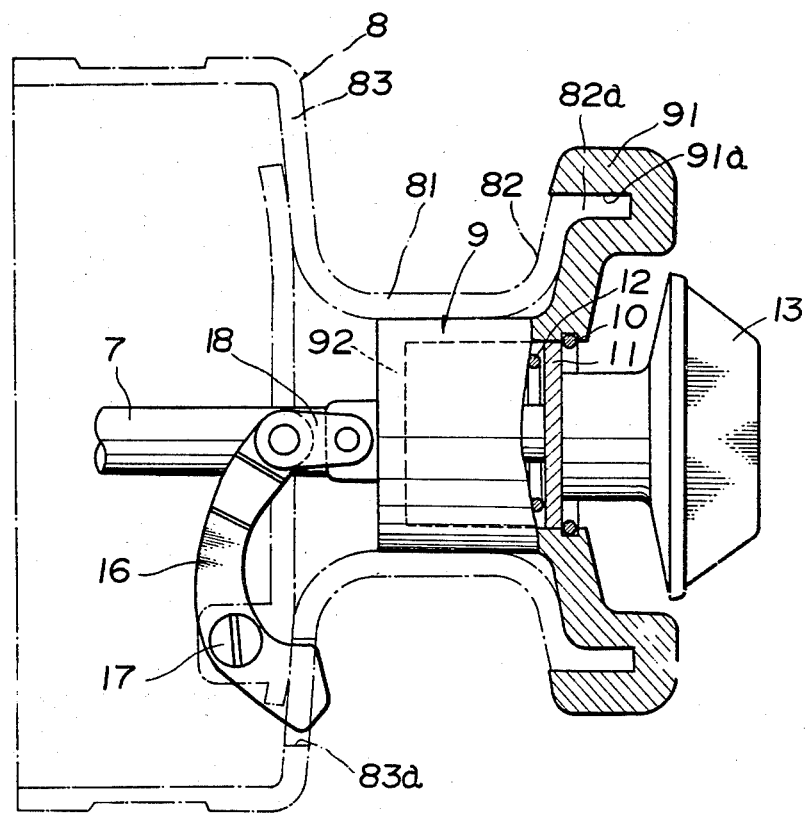
FIG. 5 is a partially cutaway enlarged side view of the sliding cylinder in FIG. 4, looking from the right side thereof.
Figure 6:
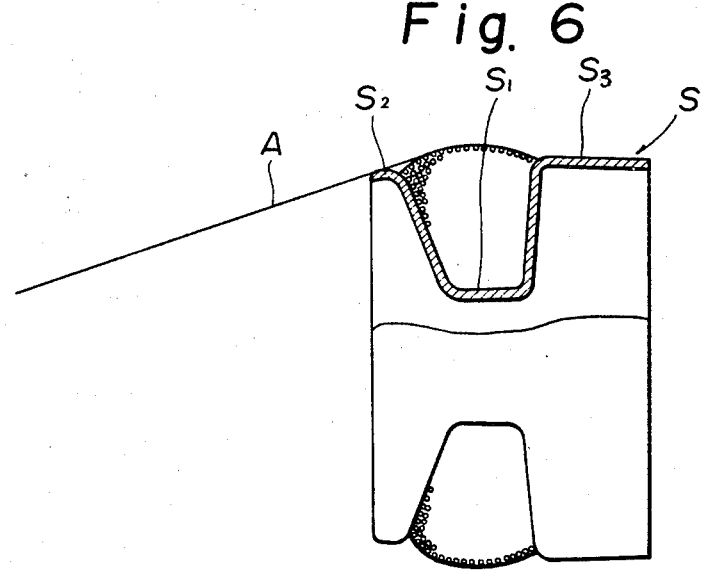
FIG. 6 is a partially cutaway side view of a spool of a conventional fishing reel.

The tubular shaft 3 carries a spool shaft 7 axially movable. The spool shaft 7 extends longitudinally from the reel body 1, and is connected at the rear end with a sliding mechanism (not shown) housed in the reel body 1 as well-known, thus moving in reciprocation following the rotation of the handle shaft, and extends at the front end ahead of the tubular shaft 3 so that a spool 8 for winding thereto a fishing line is supported immovably to the extension.

The spool 8 comprises a trunk 81 and first and second round flanges 82 and 83 at both axial ends of the trunk 81, the trunk 81 winding up thereon the fishing line through rotation of the rotary frame 4.

Now, the invention is characterized in that the spool 8 is so constructed that the first flange 82 at the side where the line is drawn out is smaller in diameter than the second flange 83, and has at the outer circumference an annular projection 82a forward of the first flange.

The trunk 81 at the spool 8 slidably supports a sliding cylinder 9 having a fishing line guide 91 in close contact with the outer periphery of annular projection 82a. The sliding cylinder 9 has at its one axial end a bottom 92, which is provided at the center thereof with a through hole through which the spool shaft 7 extends, and at the other axial end radially extends to form the fishing line guide 91. A spring 12 is inserted between the bottom 9 and a retainer 11 located thereto and locked by a C-type ring 10. A fixing member 13, such as a nut, is screwed with the foremost end of spool shaft 7 so as to restrain the retainer 11 from axially moving, whereby the spring 12 always urges the sliding cylinder 9 toward the reel body 1 so that the guide 91 may fully overlap with the first flange 82.

The guide 91 is provided with an annular groove 91a into which the annular projection 82a is received to be slidable in close contact with the guide 91. When no fishing line is wound onto the spool 8 the spring 12, as shown in FIG. 1, urges the guide 91 to fully overlap with the annular projection 82a. Hence, in this condition, the first flange 82 is fully overlapped with the guide 91 providing an apparent outer diameter approximately equal to the outer diameter of the second flange 83.

When winding the fishing line A onto the spool 8 the guide 91, as shown in FIG. 2, slides gradually forward corresponding to the bulk of the line wound against the spring 12 force, where the fishing line A is wound while being positioned at the outer periphery of the annular projection 82a, according to the bulk of the wound line.

In addition, reference numeral 14 in FIG. 2 designates a disc-like shaped spool stopper for keeping the spool 8 in position with respect to the spool shaft 7. The stopper 14 is fixed to the spool shaft 7 through a pin 15 and contacts with the rear side of the second flange 83 so as to stop axial movement of the spool 8.

The fishing reel constructed according to the foregoing is used for casting in such a manner that the bail arm 41 in FIG. 1 is turned to avoid catching the fishing line A when using the fishing rod to draw the line out of the spool 8.

The fishing line A, which is drawn out of the spool 8 for casting through a flying sinker at the end of the fishing line, is subjected to less contact resistance because the guide 91 slides forward with respect to the annular projection 82a when the bulk of the wound line is a large amount as shown by the solid line in FIG. 2. When the line is more drawn out to decrease the bulk of the wound line as shown by the phantom line, the draw-out angle of the line becomes smaller increasing the contact length of line with respect to the guide 91. At this time, the guide 91 slides toward the first flange 82 by the spring 12 force, whereby the contact length is reduced to the extent of the slide of the guide 91, resulting in avoiding increases in the contact resistance.

Accordingly, the length of the drawn-out line, which is shortened due to an increase of contact resistance following the increase of length of a drawn-out line, can be restricted from being reduced.

In the foregoing construction, the winding strength of fishing line A, when wound onto the annular projection 82a, is used for moving the sliding cylinder 9. Besides this, a rocking arm 16, as shown in FIGS. 3 through 5, is used for forcibly moving the sliding cylinder 9 when the line A is wound and its bulk reaches a substantially intermediate radial portion of the width of each of the flanges 82 and 83.

In this instance, the arm 16 is pivoted to the spool 8 including the spool stopper 14', through a pivot pin 17, and is connected at one end to the bottom 92 at the sliding cylinder 9 through a link 18, at a position apart from the through hole for the spool shaft 7, and is projected at the other end toward the trunk 81 through a window 83a formed at a substantially intermediate radial portion of the second flange 83.

Hence, in such a construction, the line A is wound onto the trunk 81 so that its bulk reaches the projecting end of arm 16, then the wound line pushes the projecting end, thereby rocking the arm 16. As a result, the sliding cylinder 9 is forced to slide forward.

Also, in the aforesaid construction, the arm 16 is formed to be adjustable in its proper position with respect to the second flange 83 so that a length of wound line, when the sliding cylinder 9 slides to allow the guide 91 to fully overlap with the annular projection 82a, may be regulated to thereby reliably move the sliding cylinder 9 with respect to the length of wound line.

As clearly understood from the aforesaid description, the spinning type fishing reel of the invention is so constructed that when the line wound onto the spool is drawn out for casting so as to decrease its bulk, the sliding cylinder axially moves to allow the fishing line guide to approach the first flange at the side the line is drawn out of the spool, whereby the contact resistance of the line with the guide is prevented from increasing even when decreasing the bulk of the wound line, resulting in that the rig can be cast to a further distance.

While an embodiment of the invention has been shown and described, the invention is not limited to the specific construction thereof, which is merely exemplary.

It is to be understood that modifications and variations may be resorted to without departing from the spirit and scope of this invention, as those skilled in the art will readily understand. Such variations and modifications are considered to be within the purview and scope of the appended claims.

What is claimed is:

1. A fishing reel comprising:
a reel body;
a tubular shaft rotatably supported at the front of said reel body;
a rotary frame having a bail arm and being fixed to said tubular shaft;
a spool shaft supported to said tubular shaft and extending forwardly of said reel body;
a spool which serves to wind a fishing line thereon and is immovably supported to said spool shaft, said spool having a trunk and a pair of first and second round flanges, said first flange being positioned at a side of which the fishing line is drawn out of said spool and being smaller in diameter than said second flange positioned at a side of said reel body, said first flange being provided at the outer circumferential edge with an annular forwardly projecting edge;
a sliding cylinder slidably supported to said trunk of said spool, said sliding cylinder having a fishing line guide slidable in close contact with the outer periphery of said projecting annular edge;
a fixing member fixed to the fore end of said spool shaft; and
a spring inserted between said fixing member and said sliding cylinder so as to urge said sliding cylinder toward said reel body.

2. A fishing reel according to claim 1, wherein an arm is supported to said spool in a swingable relationship therewith, said arm being connected at one end thereof with said sliding cylinder and projected at the other end toward said trunk through a window at an intermediate portion of said second flange at said spool.

3. A fishing reel according to claim 2, wherein said spool includes a spool stopper for stopping axial movement of said spool along said spool shaft, said spool stopper swingably supporting said arm therewith.

* * * * *